United States Patent
Kasai et al.

(10) Patent No.: US 7,328,662 B2
(45) Date of Patent: Feb. 12, 2008

(54) PLATFORM GATE DOOR DEVICE

(75) Inventors: Syoji Kasai, Hitachinaka (JP);
Toshiharu Amazawa, Hitachinaka (JP);
Katsuyoshi Kurisaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/059,373

(22) Filed: Feb. 17, 2005

(65) Prior Publication Data
US 2005/0183338 A1 Aug. 25, 2005

(30) Foreign Application Priority Data
Feb. 18, 2004 (JP) .............................. 2004-041010

(51) Int. Cl.
*B61D 47/00* (2006.01)
*B61B 1/00* (2006.01)
(52) U.S. Cl. ........................................ 105/429; 104/30
(58) Field of Classification Search ................ 104/27, 104/28, 30; 105/425, 426, 427, 429
See application file for complete search history.

(56) References Cited
U.S. PATENT DOCUMENTS 5,583,334 A * 12/1996 Baumann .................... 250/221
5,900,598 A 5/1999 Cottle et al.
6,360,668 B1 * 3/2002 Rauch ......................... 104/30

FOREIGN PATENT DOCUMENTS

DE 25 40 741 A1 3/1977
EP 0 522 478 1/1993
JP 2002-255026 * 11/2002

* cited by examiner

*Primary Examiner*—S. Joseph Morano
*Assistant Examiner*—Robert J. McCarry, Jr.
(74) *Attorney, Agent, or Firm*—Antonelli, Terry, Stout & Kraus, LLP.

(57) ABSTRACT

The invention provides a platform gate door device equipped with highly reliable photoelectric obstacle detectors that do not malfunction by disturbance light that moves, such as sunlight. The platform gate door device comprises a platform gate door 13 installed on a platform at a position where passengers get on and off a vehicle; a door control device 4 for opening and closing the platform gate door; at least two photoelectric obstacle detectors 2 disposed between the platform gate door 13 and the vehicle for detecting a presence of an obstacle, wherein each obstacle detector 2 has a light emitter 21 and a light receiver 22 disposed on either side of an opening 12 of the platform gate door, and wherein the obstacle detectors 2 are arranged so that the direction of emission from the light emitters are mutually inversed; and a switching means 3 for activating one of the plurality of obstacle detectors.

6 Claims, 5 Drawing Sheets

PLATFORM GATE DOOR DEVICE

The present application is based on and claims priority of Japanese patent application No. 2004-041010 filed on Feb. 18, 2004, the entire contents of which are hereby incorporated by reference.

BACKGROUND OF THE INVENTION

1. Field of the Invention

The present invention relates to platform gate doors disposed on a platform at locations where passengers get on and off a train, and a control apparatus for the platform gate door device having photoelectric obstacle detectors disposed on door openings.

2. Description of the Related Art

Platform gate door devices are installed on the platforms of railways, monorail systems and new transportation systems at locations where passengers get on and off a vehicle, that is, at locations on the side edge of the platform corresponding to where the doors on the vehicle are positioned, in order to ensure safety of passengers and the like on the platform. According to the platform gate door device, the doors on the platform are opened and closed in response to the stopping of the vehicle and the opening and closing operation of the doors on the vehicle. When the vehicle is not stopped, in other words, when the vehicle is not in the track of the station or when the vehicle is traveling, the platform gate door is closed. In order to ensure safety, a photoelectric obstacle detector is disposed to detect whether an obstacle or a person is present between the platform gate door and the vehicle when the platform gate door is being closed or when the door is closed.

According to this type of photoelectric obstacle detector on the platform gate door device, a light emitter and a light receiver are disposed to face each other on either side of an opening, so that when an obstacle is present in the opening, the light output from the light emitter is not received by the light receiver, by which the detector detects the presence of an obstacle. However, when ambient light (disturbance light) such as sunlight enters the light receiver, it may be possible that the detector cannot detect the presence of an obstacle.

In order to overcome this problem, the platform gate door device according to the prior art suggested the following: adopting a hood member to be disposed over the light receiver of the photoelectric obstacle detector for shielding disturbance light; setting the optical axis connecting the light emitter and the light receiver aslant so that the incoming direction of disturbance light is out of range of directivity of the light receiver; preparing two sets of photoelectric obstacle detectors composed of the light emitter and light receiver, wherein the position of one set of light emitter and light receiver and the position of the other set of light emitter and light receiver are inversed so that the detector determines that an obstacle is present when both sets detect the presence of an obstacle; and modulating the output of the light emitter and attaching a filter to the receiver (refer for example to Japanese Patent Application Laid-Open Publication No. 2002-255026).

According to this prior art example, only the amount of disturbance light such as sunlight is restricted or the incident angle of the disturbance light is limited, and it does not completely prevent the entry of disturbance light taking certain incident angles. Furthermore, when two sets of obstacle detectors having the light emitter and the light receiver in inversed positions are disposed on each side of the door to detect the presence of an obstacle, if the results of detection of the two sets differ, it is difficult to determine which obstacle detector showed the true detection result. Moreover, there was a drawback according to the prior art method using the filter in that when strong sunlight was incident on the light receiver, the modulated infrared radiation could not be detected by the receiver, according to which the detector may erroneously determine that an obstacle is present.

SUMMARY OF THE INVENTION

The object of the present invention is to provide a platform gate door device equipped with a highly reliable photoelectric obstacle detector that does not malfunction by disturbance light that moves, such as sunlight.

Another object of the present invention is to provide a platform gate door device equipped with the above photoelectric obstacle detector, capable of easily determining the failure of the photoelectric obstacle detector.

The platform gate door device according to the present invention solves the problems of the prior art by the following means: a platform door installed on a platform at a position where passengers get on and off a vehicle, a means for detecting the presence of an obstacle using obstacle detectors disposed on either side of an opening between the vehicle door through which the passengers get on and off the train, and a door control means for controlling the opening and closing of the door by detecting obstacles, wherein the obstacle detectors each have a light emitter and a light receiver disposed on either side of the opening, and based on the movement of the disturbance light, the obstacle detector including the light emitter and light receiver being activated is switched so as not to receive the moving disturbance light.

In other words, the present invention provides a platform gate door device comprising a platform gate door installed on a platform at a position where passengers get on and off a vehicle; a door control device for opening and closing the platform gate door; at least two photoelectric obstacle detectors disposed between the platform gate door and the vehicle for detecting a presence of an obstacle, wherein each obstacle detector has a light emitter and a light receiver disposed on either side of an opening of the platform gate door, and wherein the obstacle detectors are arranged so that the directions of emission of the light emitters are mutually inversed; and a switching means for activating one of the plurality of obstacle detectors.

According to the present invention, the platform gate door device is designed so that the switching of the obstacle detectors is performed based on date and time. According further to the present invention, the device comprises a disturbance light receiver, and the switching of the obstacle detectors is performed based on an amount of disturbance light received by the disturbance light receiver.

According to the present invention, the platform gate door device is designed so that the switching of the obstacle detectors of the platform gate door device is performed collectively per platform.

According to the present invention, the platform gate door device comprises a platform gate door installed on a platform at a position where passengers get on and off a vehicle; a door control device for opening and closing the platform gate door; at least three photoelectric obstacle detectors disposed between the platform gate door and the vehicle for detecting a presence of an obstacle, wherein each obstacle detector has a light emitter and a light receiver disposed on either side of an opening of the platform gate door; a switching means for activating one of the plurality of obstacle detectors; and an obstacle detector failure determination unit. According further to the present invention, the platform gate door device comprises a disturbance light receiver, wherein the failure determination of the obstacle detector is performed when an amount of disturbance light received by the disturbance light receiver is within a predetermined range.

According to the present invention, it is possible to prevent without fail the disturbance light such as sunlight from being incident on the detector, and to effectively determine the occurrence of failure of the obstacle detector by installing a plurality of detectors.

DETAILED DESCRIPTION OF THE PREFERRED EMBODIMENTS

Figure 1:
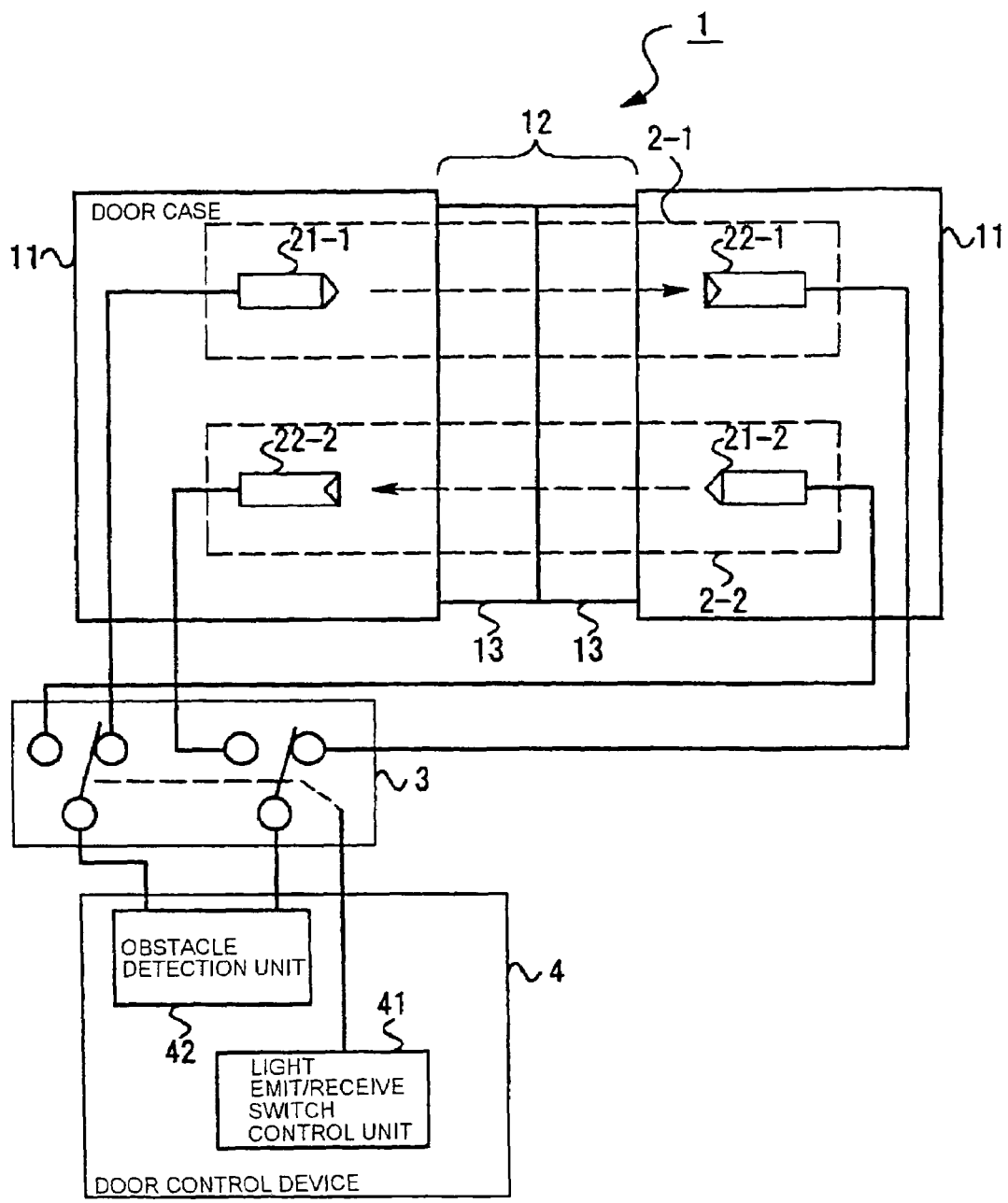
FIG. 1 is a block diagram illustrating the structure of a platform gate door device according to a first embodiment of a first invention.

The structure of a platform gate door device according to a first embodiment of the present invention will be described with reference to FIG. 1. The platform gate door device 1 according to the present invention comprises at least two sets of obstacle detectors 2-1 and 2-2 each having a light emitter 21 and a light receiver 22, a light emit/receive switch circuit 3, and a door control device 4. The obstacle detector 2 is installed so that the light emitter 21 and the light receiver 22 are positioned facing each other at either side of an opening 12 on a door case 11 of the platform gate door device 1. The light emitter 21 and the light receiver 22 of the obstacle detector 2 are disposed between a platform gate door 13 and the vehicle entering the platform.

At least two obstacle detectors 2-1 and 2-2 are arranged so that their light emitters 21 and light receivers 22 are inversely positioned at the opening 12. That is, on one door case 11, the light emitter 21-1 of the first obstacle detector 2-1 and the light receiver 22-2 of the second obstacle detector 2-2 are vertically arranged, and on the other door case 11 on the opposite side of the opening 12, the light receiver 22-1 of the first obstacle detector 2-1 and the light emitter 21-2 of the second obstacle detector 2-2 are vertically arranged.

The light emit/receive switch circuit 3 selects and activates either one of the first obstacle detector 2-1 or the second obstacle detector 2-2 based on the command from a light emit/receive switch control unit 41. The light emit/receive switch circuit 3 can be either a mechanical switch or an electronic switch driven by a microcomputer.

The door control device 4 is a device that carries out the opening/closing operation of the platform gate door 13 that selects and activates either one of the at least two obstacle detectors, detects the presence of an obstacle by the selected obstacle detector, and controls the closing operation of the platform gate door based on this obstacle detection information. In addition to the ordinary function to control the open/close operation of the platform gate door 13, the door control device 4 has at least a light emit/receive switch control unit 41 for selecting and activating at least one of more than two obstacle detectors, and an obstacle detection unit 42 for detecting the presence of an obstacle. The light emit/receive switch unit 41 carries out a switching operation for selecting one of the obstacle detectors so that the disturbance light such as sunlight that is moving is not incident on the light receiver of the obstacle detector. For example, the light emit/receive switch control unit 41 operates to perform the switching process according to time, wherein during the morning it activates the obstacle detector having its light receiver disposed on the east side while during the afternoon it activates the obstacle detector having its light receiver disposed on the west side. Thus, the light receiver of the active obstacle detector will not receive morning sunlight from the sun during the mornings and will not receive sunset light during the afternoon. According thereto, the detector will not receive direct light from the sun which may cause the detector to malfunction.

Moreover, if sunlight is directly incident on the light receiver only during a certain season, it is possible to switch the light emitter and light receiver only during that season.

Even further, this switching operation can be performed manually, or automatically based on a program set in advance and using a clock equipped to the control device.

Figure 2:
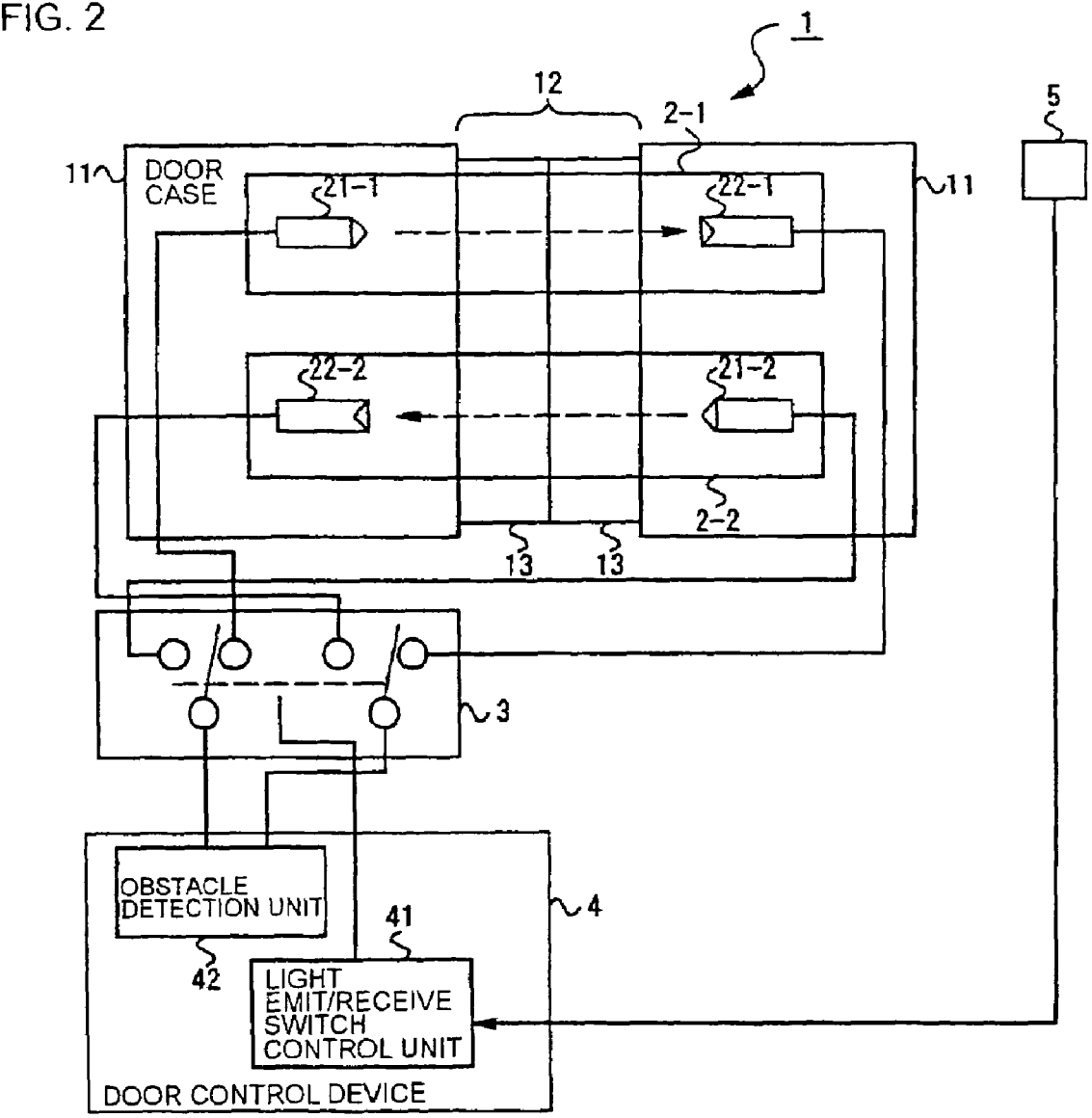
FIG. 2 is a block diagram illustrating the structure of a platform gate door device according to a second embodiment of the first invention.

FIG. 2 is used to describe the structure of a platform gate door device according to a second embodiment of the present invention. This embodiment carries out the light emit/receive switch control based on the strength of the received disturbance light, and for example, it has a disturbance light receiver 5 for receiving the disturbance light. When the amount of disturbance light received by the disturbance light receiver 5 exceeds a predetermined value, the light emit/receive switch control unit 41 switches the activation of the first obstacle detector 2-1 and the second obstacle detector 2-2. The set value for the amount of disturbance light should be determined so that the switching operation is carried out before the received light exceeds the range of normal operation of the light receiver 22.

According to the above arrangement, the platform gate door device can be operated without being affected by the disturbance light.

Figure 3:
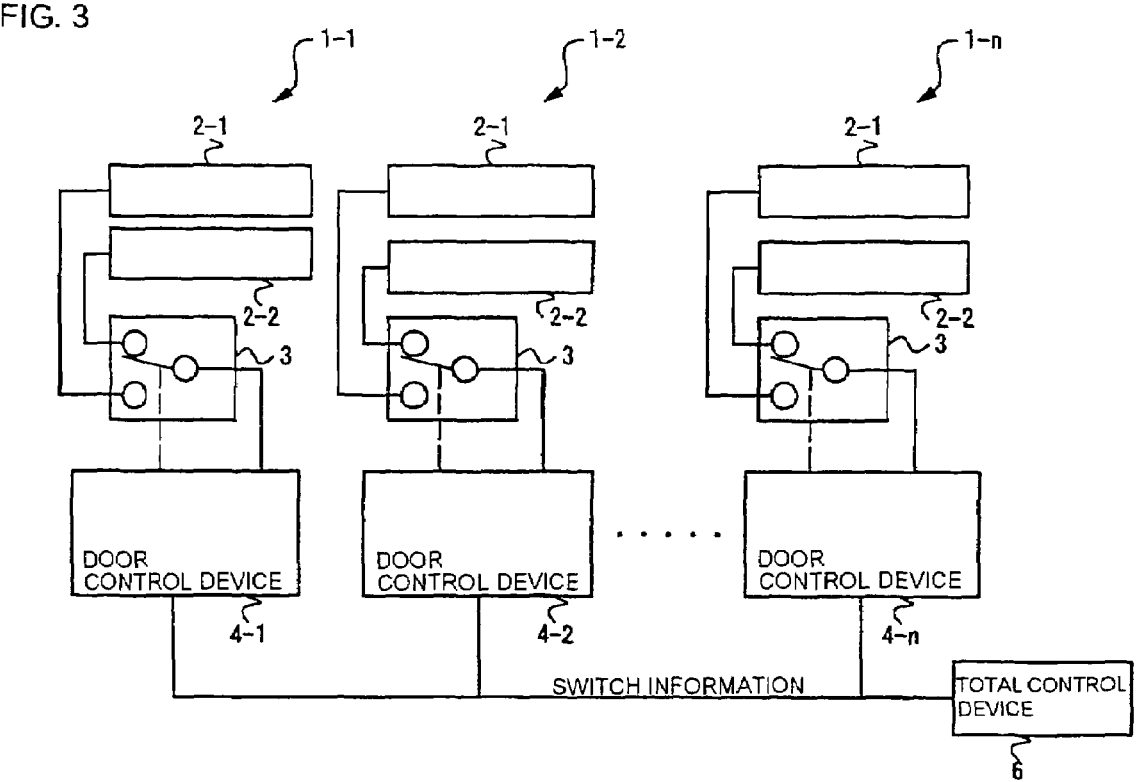
FIG. 3 is a block diagram illustrating the structure of a platform gate door device according to a third embodiment of the first invention.

FIG. 3 is referred to in describing a platform gate door device according to a third embodiment of the present invention. According to this embodiment, the platform gate door devices 1-1 through 1-n installed on a platform are subjected collectively to light emit/receive switch control. Each of the platform gate door devices 1-1 through 1-n receive switch information provided from a total control device 6 provided on each of the platforms or to cover a number of platforms, according to which the door control devices 4-1 through 4-n on each of the platform gate door devices 1 carry out switching control between the first and second obstacle detectors 2-1 and 2-2. The total control device 6 includes a clock, so there is no need to install clocks or disturbance light receiver 5 to each of the door control devices 4-1 through 4-n of the platform gate door devices 1-1 through 1-n. Further, the disturbance light receiver 5 can be installed on a light receiving end of the platform, and the signal output from the receiver 5 is received by the total control device 6 to carry out total control.

According to the above platform gate door device, the failure determination of the obstacle detector 2 can be carried out using the detection signals from three or more obstacle detectors.

Figure 4:
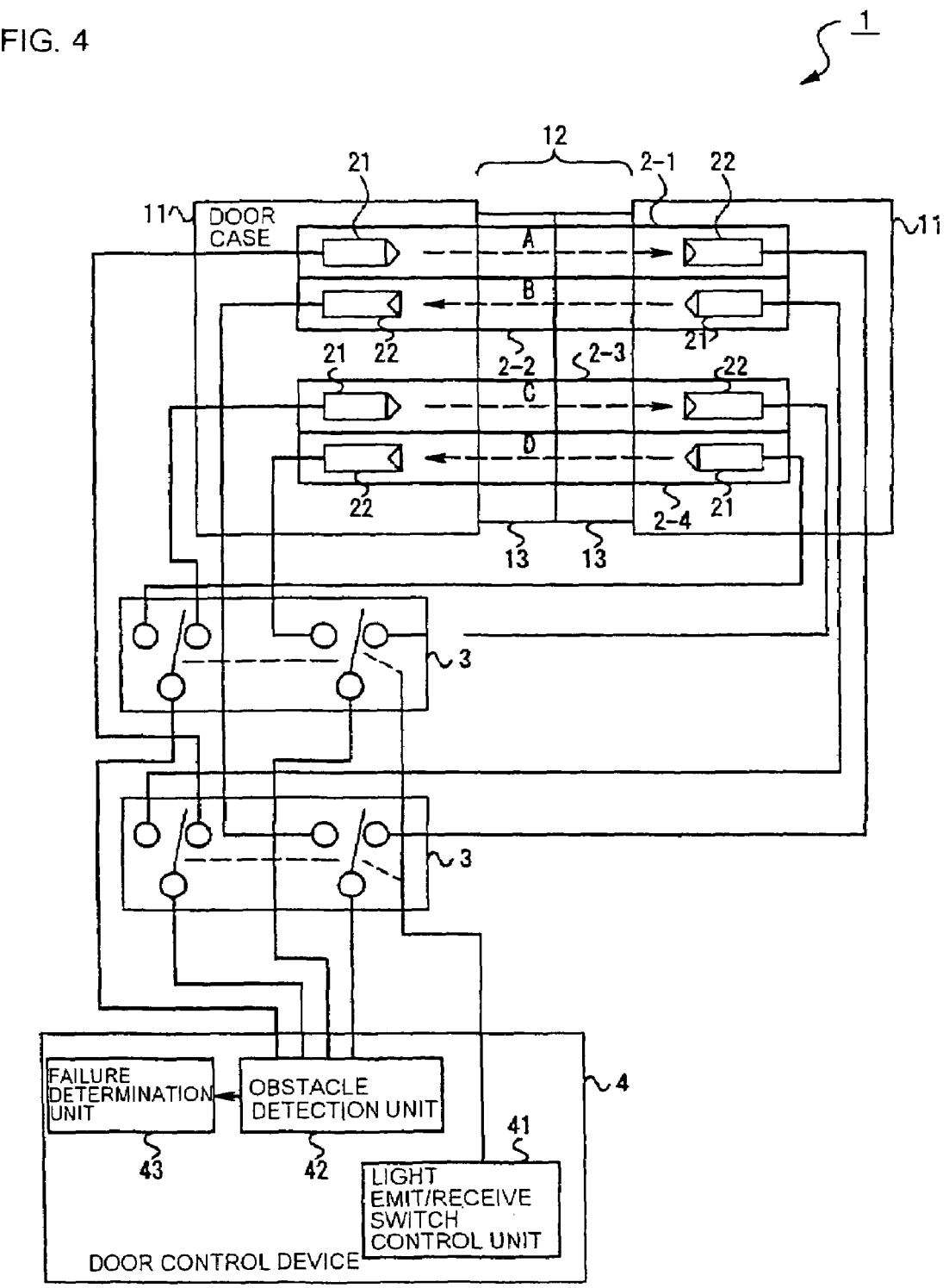
FIG. 4 is a block diagram illustrating the structure of a platform gate door device according to a second invention.

FIG. 4 is referred to in describing the structure of a platform gate door device according to a second invention capable of determining the failure of an obstacle detector. This invention adopts a system in which two sets of obstacle detectors, each set including a first obstacle detector 2-1 and a second obstacle detector 2-2 as disclosed in the aforementioned invention, are disposed vertically one above the other. In other words, the present invention relates to a system equipped with four obstacle detectors 2, each composed of a light emitter 21 and a light receiver 22. According to this system, in normal operation, obstacles are detected by constantly activating the two vertically disposed obstacle detectors A2-1 and C2-3, or the obstacle detectors B2-2 and D2-4, which are operated in the same direction. The process for determining failure of the obstacle detector 2 is carried out by performing an obstacle detection by alternately selecting the obstacle detectors A2-1 and C2-3 or the obstacle detectors B2-2 and D2-4. In other words, if the results of obstacle detection differ between the obstacle detectors A2-1 and C2-3 and the obstacle detectors B2-2 and D2-4, the results are compared, and based on majority decision, the obstacle detector that output the minority result is determined as failure.

Figure 5:
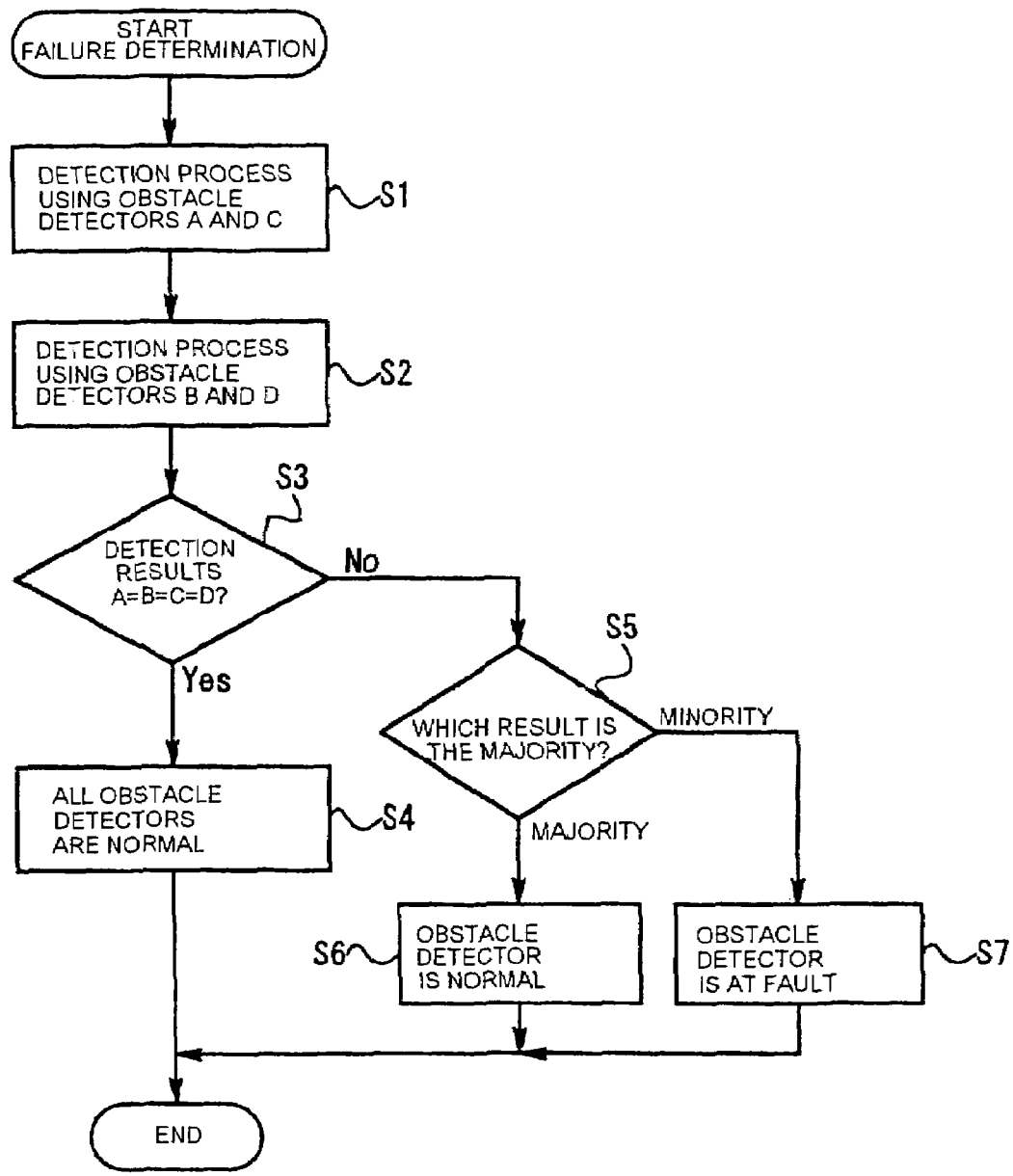
FIG. 5 is a flowchart describing a failure determination process of obstacle detectors of the platform gate door device of FIG. 4.

The process for determining failure of the obstacle detector will now be described with reference to FIG. 5. When the process for determining failure is started, at first, obstacle detection process is performed using obstacle detectors A2-1 and C2-3 (S1). Next, obstacle detection process is performed using obstacle detectors B2-2 and D2-4 (S2). Thereafter, it is determined whether the detection results of the obstacle detectors A2-1, C2-3 and obstacle detectors B2-2 and D2-4 are all the same (S3). If the results of detection in step S3 are all the same, it is determined that the obstacle detectors A2-1 through D2-4 are normal (S4), and the failure determination process is terminated. If the detection results vary according to the determination process of step S3, the majority result is determined (S5), and the obstacle detectors outputting the majority result are determined as normal (S6), while the obstacle detector outputting the minority result is determined to be at fault (S7), and the failure determination process is terminated.

The above failure determination process is performed when the detectors are not affected by disturbance light, that is, when sunlight is not incident directly on any of the light receivers, or when the amount of light received by the disturbance light receiver 5 is within a determined range.

The second invention has been described based on the example in which four obstacle detectors 2 are used, but for example, the invention requires a minimum of three obstacle detectors 2, which are a first obstacle detector A2-1, a second obstacle detector B2-2 and a third obstacle detector C2-3. According to such example, the detection process of step S2 should be carried out for the second obstacle detector B2-2 while the determination of steps S3 and S5 are to be carried out for the first, second and third obstacle detectors A2-1, B2-2 and C2-3.

What is claimed is:

1. A platform gate door device comprising:
   a platform gate door installed on a platform at a position where passengers get on and off a vehicle;
   a door control device for opening and closing the platform gate door;
   at least two photoelectric obstacle detectors disposed between the platform gate door and the vehicle for detecting a presence of an obstacle, wherein each obstacle detector has a light emitter and a light receiver disposed on either side of an opening of the platform gate door, and wherein the at least two obstacle detectors are arranged so that the directions of emission of the light emitters are in first and second directions that are mutually inversed from each other; and
   a switching means for activating one of the at least two obstacle detectors based on movement of a disturbance light, wherein the one obstacle detector being activated is switched so as not to receive the moving disturbance light;
   wherein the switching means operates to perform the switching process according to time, and wherein during first time period, the switching means activates the obstacle detector having its light receiver disposed along the first direction while during a second time period the switching means activates the obstacle detector having its light receiver disposed along the second direction.

2. The platform gate door device according to claim 1, wherein the switching of the obstacle detectors is performed based on date and time.

3. The platform gate door device according to claim 1 further comprising a disturbance light receiver, and the switching of the obstacle detectors is performed based on an amount of disturbance light received by the disturbance light receiver.

4. The platform gate door device according to any one of claims 1 through 3, wherein the switching of the obstacle detectors of the platform gate door device is performed collectively per platform.

5. A platform gate door device comprising:
   a platform gate door installed on a platform at a position where passengers get on and off a vehicle;
   a door control device for opening and closing the platform gate door;
   at least three photoelectric obstacle detectors disposed between the platform gate door and the vehicle for detecting a presence of an obstacle, wherein each obstacle detector has a light emitter and a light receiver disposed on either side of an opening of the platform gate door;
   a switching means for activating one of the at least three obstacle detectors; and
   an obstacle detector failure determination unit configured to operate in such a manner That when the obstacle detection process for determining failure is started, at first, the obstacle detection process is performed using the two obstacle detectors, next, the obstacle detection process is performed using the further obstacle detector, and if the detection results from the at least three obstacle detectors are all the same, it is determined that the at least three obstacle detectors are normal, and if the detection results vary, then the majority results is determined, and the obstacle detectors outputting the majority results are determined to be normal, while the obstacle detector outputting the minority result is determined to be at fault.

6. The platform gate door device according to claim 5 further comprising a disturbance light receiver, wherein the failure determination of the obstacle detector is performed when an amount of disturbance light received by the disturbance light receiver is within a predetermined range.

* * * * *